United States Patent
Kadokura

[11] Patent Number: 5,925,132
[45] Date of Patent: Jul. 20, 1999

[54] METHOD AND APPARATUS FOR IMPLEMENTING POWER SAVING MODE

[75] Inventor: Yusuke Kadokura, Kamakura, Japan

[73] Assignee: Canon Kabushiki Kaisha, Tokyo, Japan

[21] Appl. No.: 08/787,543

[22] Filed: Jan. 22, 1997

[30] Foreign Application Priority Data

Jan. 23, 1996 [JP] Japan .................................. 8-027416

[51] Int. Cl.$^6$ ...................................................... G06F 1/32
[52] U.S. Cl. ........................... 713/323; 713/310; 713/321; 713/330
[58] Field of Search ........................ 395/750.07, 750.04, 395/750.05, 750.01, 750.06, 557, 560, 750.02; 364/707

[56] References Cited

U.S. PATENT DOCUMENTS

| | | | |
|---|---|---|---|
| 5,404,541 | 4/1995 | Hirosawa et al. | 395/750.06 |
| 5,454,114 | 9/1995 | Yach et al. | 395/750.07 |
| 5,675,810 | 10/1997 | Sellers | 395/750.05 |
| 5,721,936 | 2/1998 | Kikinis et al. | 395/750.05 |
| 5,768,602 | 6/1998 | Dhuey | 395/750.04 |

*Primary Examiner*—Gopal C. Ray
*Attorney, Agent, or Firm*—Fitzpatrick, Cella Harper & Scinto

[57] ABSTRACT

A device control apparatus and a corresponding method allow the smooth recovery from a power saving mode to a stand-by state without malfunction. When the power saving mode is on and a signal which causes the release of the power saving mode is received, an output of a sleep mode release signal is temporarily driven low. After a first predetermined time period has elapsed, a power supply and an oscillation device are started. After a second predetermined time, a sleep state of a control unit is released, and the device is returned to a stand-by state.

16 Claims, 3 Drawing Sheets

METHOD AND APPARATUS FOR IMPLEMENTING POWER SAVING MODE

BACKGROUND OF THE INVENTION

1. Field of the Invention

The present invention relates to device control method and apparatus having a power saving mode function to reduce power consumption of a device.

2. Related Background Art

In a prior art electronic apparatus including a main unit, a peripheral device and a device control apparatus for controlling the peripheral device, there has been proposed a device control apparatus in which a power and a clock signal by an oscillation device are supplied to the peripheral device and the main unit is set to a so-called power saving mode when the main unit is in an actuatable stand-by state and an access such as an operation command is not present for a predetermined time interval. In the power saving mode, the supply of the power and the clock signal to the peripheral device is shut down and a clock generator included in a control unit of a CPU (central processing unit) for controlling the peripheral device is stopped to set a state by a device leakage current (so-called sleep mode) in order to attain the power saving.

In this device control apparatus, when a call from a line connected to the main unit or a signal generated by a command relating to the start of operation by an operator is received in the power saving mode, it is assumed as a factor to release the power saving mode and the main unit is recovered to a stand-by state. In recovering to the stand-by state, the sleep mode of the control unit is released and the shut-down of the supply of the power and the clock signal are released by the control through a port.

However, in the prior art device control apparatus described above, when the factor to release the power saving mode occurs, the release of the shut-down of the supply of the power and the clock signal and the release of the sleep mode of the control unit are immediately conducted. Since a certain time period is required before the supply of the power and the clock signal are stabilized, the state of the power supply and the oscillation device connected to the peripheral device is unstable when the main unit is recovered to the stand-by state so that the peripheral device circuit may malfunction.

SUMMARY OF THE INVENTION

It is an object of the present invention to provide a device control apparatus which allows the recovery from the power saving mode to the stand-by state without causing the malfunction of the peripheral device circuit.

DETAILED DESCRIPTION OF THE PREFERRED EMBODIMENTS

One embodiment of the present invention is now explained with reference to the accompanying drawings.

Figure 1:
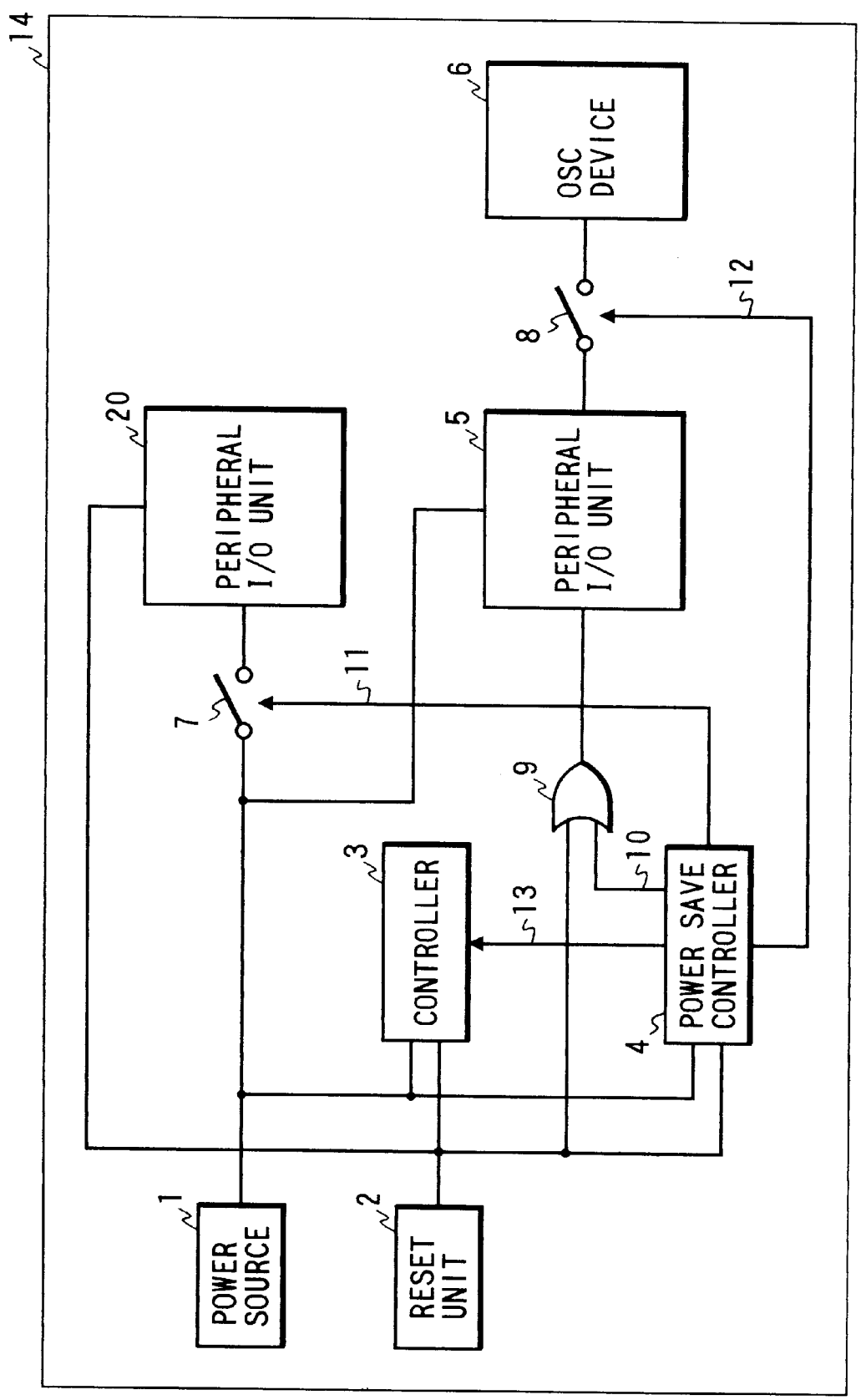
FIG. 1 shows a block diagram of a configuration of a power saving control apparatus including a device control apparatus in accordance with one embodiment of the present invention.

FIG. 1 shows a block diagram of a configuration of a power saving control apparatus including a device control apparatus in accordance with one embodiment of the present invention. In FIG. 1, numeral 14 denotes a power saving control apparatus which comprises the device control apparatus in accordance with the present embodiment as well as a power supply 1, a reset unit 2, a control unit 3, a power saving control unit 4, a first peripheral I/O (input/output) unit 5, an oscillation device 6 and a second peripheral I/O unit 20.

The power supply 1 converts a power from a primary power to a secondary power and supplies the power to the control unit 3, the power saving control unit 4, the first peripheral I/O unit 5 and the second peripheral I/O unit 20 which are connected to the power supply 1 through a power line.

The reset unit 2 comprises voltage detection unit (not shown) for detecting an output voltage to monitor an output state of the power supply 1 and outputs a reset signal in accordance with the detected voltage to the control unit 3, the power saving control unit 4, an OR gate 9 and the second peripheral I/O unit 20 which are connected to the reset unit through a reset line. The reset signal serves to temporarily suppress the operation in order to prevent the malfunction due to various signals externally inputted to the respective components.

The control unit 3 comprises a CPU (central processing unit) and controls the entire power saving control apparatus 14 in accordance with a control program stored in a ROM (read-only memory), not shown.

The power saving control unit 4 controls the output of the power and the reset signal when the device control apparatus is recovered from the power saving mode to the stand-by state. The control unit 3, a first switch (SW) 7 and a second switch (SW) 8 are connected to the power saving control unit 4 through a signal line. A sleep mode release control signal 13 from the power saving control unit 4 is inputted to the control unit 3.

The OR gate 9 ORs the reset signal from the reset unit 2 and the reset signal 10 from the power saving control unit 4. Namely, when either one of the signals is inputted, it outputs the reset signal to the first peripheral I/O unit 5 connected to the OR gate 9 through the reset line.

The first peripheral I/O unit 5 is directly connected to the power supply 1 and also connected to the oscillation device 6 through the second SW8. The oscillation device 6 supplies the clock signal to the first peripheral I/O unit 5. In the power saving mode, the second SW8 is in the open position so that the clock signal supplied from the oscillation device 6 to the peripheral I/O device 5 is shut off while the supply of the power from the power supply 1 to the peripheral I/O unit 5 is not shut off even when the second SW8 is open. The switching of the second SW8 is controlled by a clock control signal (CLKCTL) 12 outputted from the power saving control unit 4.

The second peripheral I/O unit 20 is connected to the power supply 1 through the first SW7. In the power saving mode, the first SW7 is in the open position and the power supplied from the power supply 1 is shut off. The switching of the first SW7 is controlled by a power control signal (PWCTL) 11 outputted from the power saving control unit 4.

A timing of occurrence of various signals in the power saving control apparatus 14 is now explained.

Figure 2:
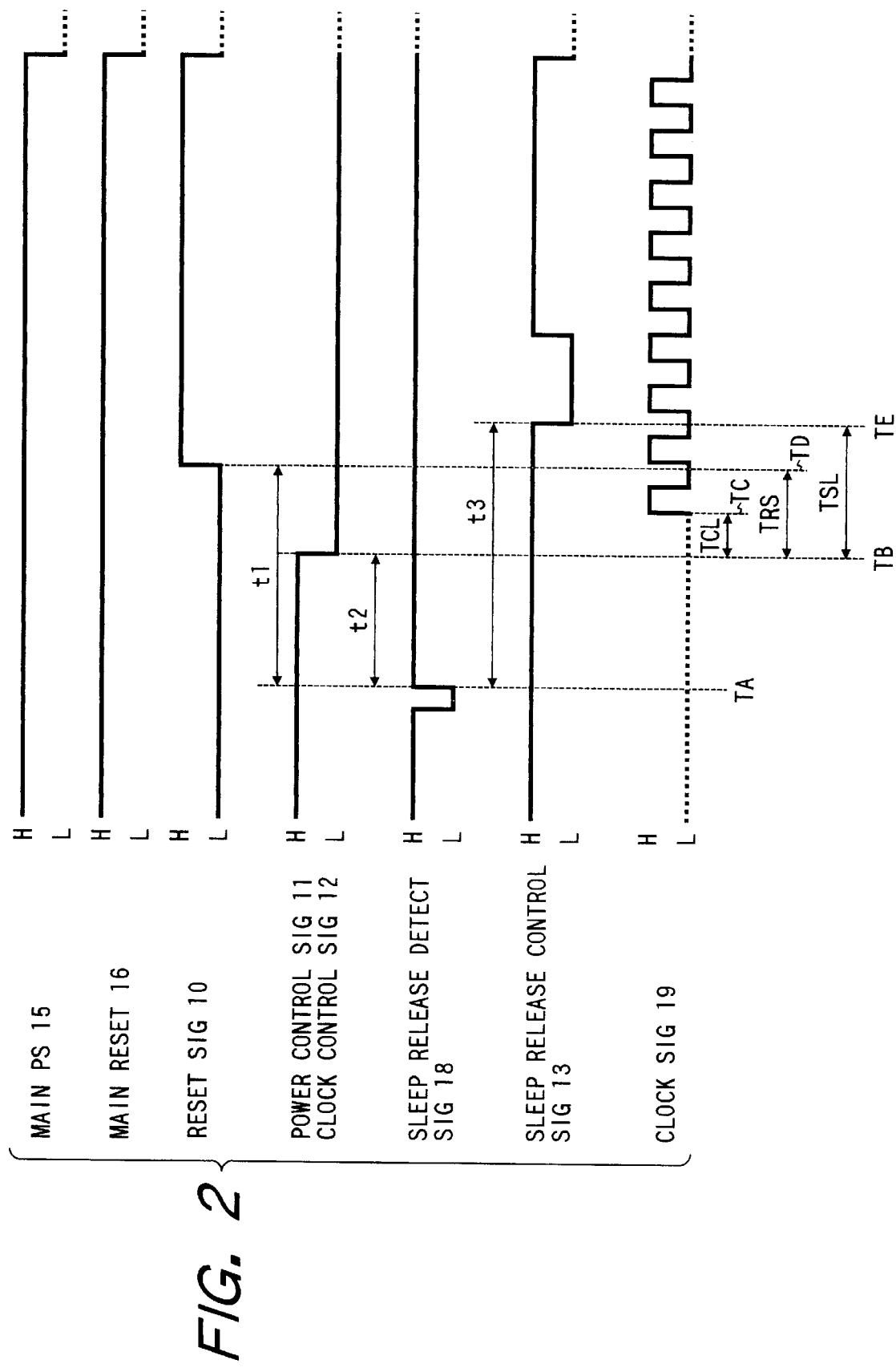
FIG. 2 shows a timing chart indicating a timing of occurrence of various signals in the power saving control apparatus.

FIG. 2 shows a time chart indicating the timing of occurrence of the signals in the power saving mode of the power saving control apparatus 14 of the present embodiment. In FIG. 2, the like signals to those shown in FIG. 1 are designated by the like numerals. In the representation of the signal outputs in FIG. 2, a high output (H) is shown on an upper side and a low output (L) is shown on a lower side.

In FIG. 2, a signal 15 indicates an output state of the power supply 1 which is a main power supply. A signal 16 indicates a timing at which the reset signal is outputted by the power saving control unit 4 in accordance with a drop of the detected output voltage of the power supply 1. It is activated by the output L so that the operation of the entire power saving control unit 14 is suppressed.

A reset signal 10 is outputted by the power saving control unit 4 and the output is L so long as the output L is active and the power saving control apparatus 14 is in the power saving mode. When the output becomes H, the reset of the first peripheral I/O unit 5 is released.

Outputs H of a power control signal 11 and a clock control signal 12 are rendered active. When the output of the power control signal 11 becomes L, the first SW7 is closed so that the power is supplied again to the second peripheral I/O unit 20, and when the output of the clock control signal 12 becomes L, the second SW8 is closed so that the clock signal from the oscillation device 6 is supplied again to the first peripheral I/O unit 5.

An output a sleep mode release factor signal 18 is temporarily rendered to L and the output L is rendered active when a signal which is a factor of the release of the power saving mode (for example, a call signal from a telephone line, a hooking detection signal, a detection signal from a clock IC, a document sheet detection signal generated when a copy/send document sheet is set or a signal generated by a start of operation command by an operator, when the power saving control apparatus 14 is a facsimile apparatus) is detected by a detection unit, not shown, of the power saving control unit 4.

An output of a sleep mode release control signal 13 is rendered active, and when the output becomes L, the sleep mode of the control unit 3 is released and the operation control to the respective elements is resumed.

A clock signal 19 indicates the clock signal by the oscillation device 6 and the generation and the supply of the clock signal to the first peripheral I/O unit 5 is resumed after the second SW8 is closed by the clock control signal 12. By a nature of the oscillation device 6, a certain period TCL is required before the oscillation is stabilized.

When the power saving control unit 4 detects the signal which is the factor of release of the power saving mode, a chattering process is conducted and at a time point TA at which the output is L for a predetermined time period, the power saving control unit 4 starts a timer T1, a timer T2 and a timer T3. The timer T1 functions to continue the output L of the reset signal 10 by the power saving control unit 4 when the power saving control apparatus 14 is in the power saving mode and it is set to a predetermined time period t1. The timer T2 functions to continue the output H of the power control signal 11 and the clock signal 12 by the power saving control unit 4 and it is set to a predetermined time period t2. The timer T3 functions to delay the generation of the output L of the sleep mode release control signal 13 by the power saving control unit 4 and it is set to a predetermined time period t3.

The start point of the predetermined time periods t1, t2 and t3 is the time point TA and the predetermined time period t2 is set shorter than the predetermined time periods t1 and t3 and it may be 0. At a time point TB, the power is supplied again to the second peripheral I/O unit 20 and the clock signal is supplied again to the first peripheral I/O unit 5 from the oscillation device 6. The predetermined time point t1 is set to a period sufficient for the power supply 1 and the oscillation status of the oscillation device 6 to be stabilized and it is set such that the period is terminated at a time point TD which is later than a time point TC at which the period TCL is terminated. Namely, the predetermined time period t1 is set to be longer than the predetermined time period t2 by a period TRS. The predetermined time period t3 is set to be longer than the predetermined time period t2 by a period TSL so that it is terminated at a time point TE later than the predetermined time period t1 in order to secure the time for the power saving control unit 4, the first peripheral I/O unit 5 and the second peripheral I/O unit 20 to be stabilized.

Figure 3:
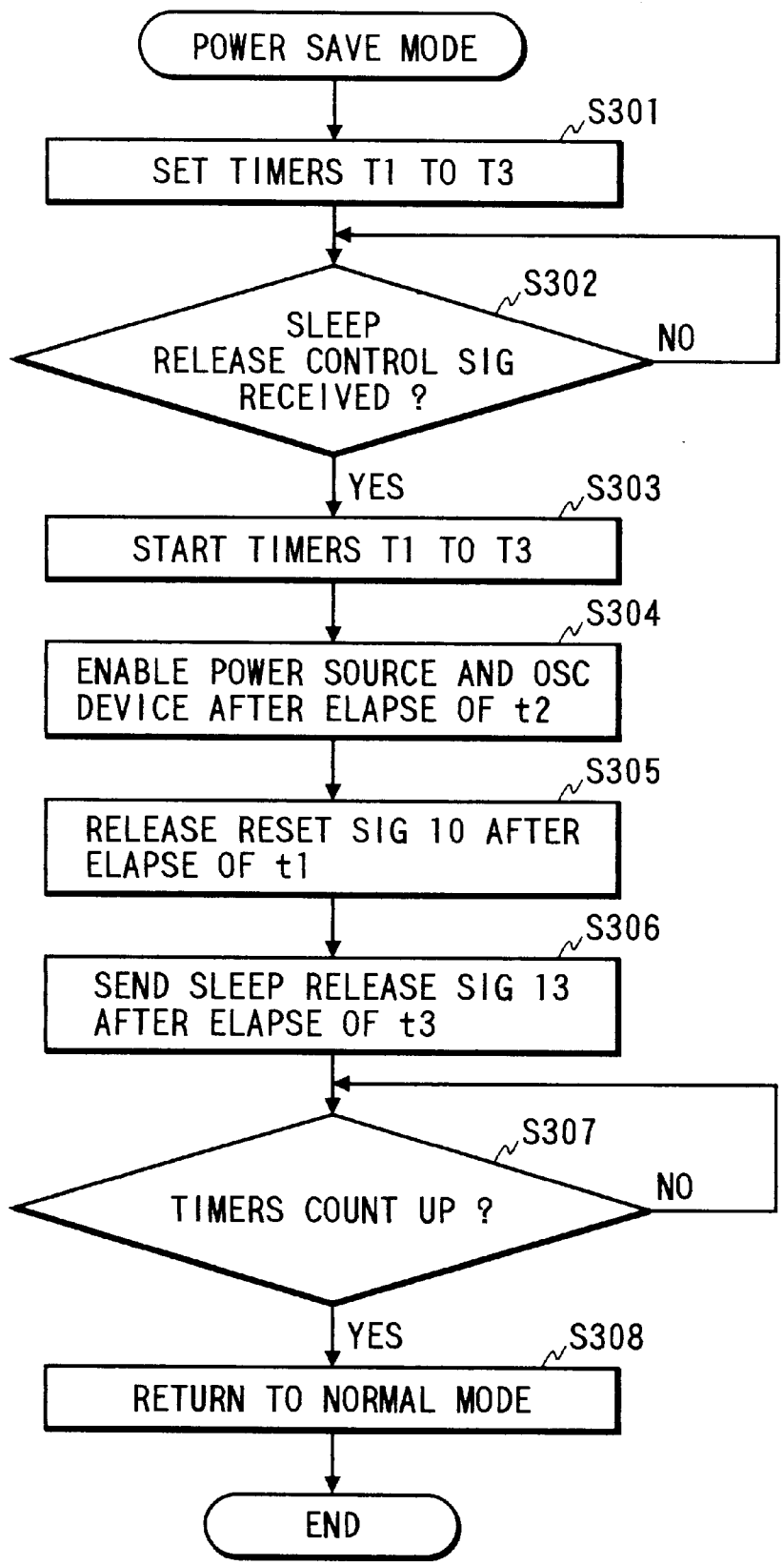
FIG. 3 shows a flow chart of a signal processing procedure in recovering from a power saving mode to a stand-by state in the power saving control apparatus.

FIG. 3 shows a flow chart indicating a signal processing procedure of the stand-by state recovery in the power saving control apparatus of the present embodiment. It corresponds to the time chart of FIG. 2. The present process is executed by the power saving control unit 4.

The power saving control apparatus 14 assumes the power saving mode when any access to the present apparatus, for example, a signal similar to the signal which is the factor of the release of the power saving mode described above is not received in a predetermined time period, and the present process is started.

First, the timers T1, T2 and T3 are set to the predetermined time periods t1, t2 and t3, respectively (step S301), and whether the sleep mode release signal 13 requiring the recovery from the power saving mode is received by the power saving control unit 4 or not is determined (step S302). The determination process is repeated until the sleep mode release control signal 13 is received, and when the sleep mode release control signal 13 is received, the timers T1, T2 and T3 are started (step S303). When the predetermined time period t2 elapses, the power supply 1 and the oscillation device 6 are started by the power control signal 11 and the clock control signal 12 (step S304), and then, when the predetermined time period t1 elapses, the reset signal 10 is released (output H) so that the reset of the first peripheral I/O unit 5 is released (step S305). When the predetermined time period t3 elapses, the sleep mode release control signal 13 is outputted to the control unit 3 so that the sleep mode of the control unit 3 is released (step S306).

Then, whether all timers have been terminated or not is determined (step S307), and if they are not terminated, the determination process is repeated, and when all timers are terminated, the normal operation mode or the stand-by mode is recovered (step S308) and the process is terminated.

In accordance with the present process, when the sleep mode release factor signal 18 is received and the power saving control apparatus 14 recovers from the power saving mode to the stand-by state, the sleep state of the control unit 3 is not immediately released after the start of the power supply 1 and the oscillation device 6 but it is released after the delay of the time period TSL so that the recovery to the stand-by state is conducted after all of the power saving control unit 4, the first peripheral I/O unit 5 and the second peripheral I/O unit 20 have been stabilized. Accordingly, the malfunction of the first peripheral I/O unit 5 and the second peripheral I/O unit 20 is prevented.

Further, since the first peripheral I/O unit 5 is reset for the period TRS after the start of the power supply 1 and the oscillation device 6, the period TCL to stably supply the power and the clock signal to the first peripheral I/O unit 5 is secured. Accordingly, the malfunction due to the external signal is prevented.

Further, since the power saving control unit 4 for outputting the reset signal 10 for resetting the first peripheral I/O unit 5 is provided separately from the reset unit 2 for suppressing the operation of the device control apparatus in accordance with the voltage of the power supply 1, the malfunction when the power saving control apparatus 14 is shifted from the power saving mode to the stand-by state is prevented even if the peripheral device is of a type in which the power line to the power supply 1 is not normally shut off like the first peripheral I/O unit 5.

In the present embodiment, the operations of the second peripheral I/O unit 20 which is connected to the disconnectable power line and rendered to the power saving mode by the shut-off of the power supply and the first peripheral I/O unit 5 connected to the non-disconnectable power line and rendered to the power saving mode by the shut-off of the supplied clock signal are controlled. Alternatively, only one of the operations may be controlled.

What is claimed is:

1. A device control apparatus comprising:
   shut-off means for shutting off an operation source of a device;
   control inhibit means for inhibiting the control of operation of said device;
   receive means for receiving a predetermined signal from at least one signal source;
   shut-off release means for releasing the shut-off of the operation source by said shut-off means after the reception of said predetermined signal by said receive means;
   inhibition release means for releasing the inhibition of the control by said control inhibit means after the elapse of a first predetermined time period from the release of the shut-off of the operation source by said shutoff means;
   reset means for suppressing the operation of said device; and
   reset release means for releasing the suppression of the operation by said reset means after the elapse of a second predetermined period shorter than said first predetermined period from the release of the shut-off of the operation source by said shut-off release means.

2. A device control apparatus according to claim 1 wherein said operation source is at least one of a power supplied to said device and a clock signal inputted to said device from an oscillation device connected to said device.

3. A device control apparatus according to claim 1 wherein said predetermined signal is generated by the at least one signal source in response to at least one of the following events: a call from a line connected to said device control apparatus, hooking detection, read document sheet detection, detection from a clock IC, and a command relating to the start of operation by an operator of said device control apparatus.

4. A device control apparatus according to claim 1 wherein said first predetermined period is long enough for said device to be stabilized after the release of the shut-off of said operation source by said shut-off release means.

5. A device control apparatus according to claim 1 wherein said second predetermined period is long enough for the stable supply of the power to said device after the release of the shut-off of said operation source by said shut-off release means.

6. A device control apparatus according to claim 1 wherein said second predetermined period is long enough for the stable supply of said clock signal to said device after the release of the shut-off of said operation source by said shut-off release means.

7. A device control apparatus according to claim 1 wherein said reset means is provided separately from apparatus reset means for suppressing the operation of said device control apparatus in accordance with a voltage of a main power supply.

8. A device control apparatus according to claim 1 wherein the shut-off of the operation source by said shut-off means and the inhibition of the control by said control inhibit means are conducted when said device control apparatus is ready to operate and none of a call from a line connected to said device control apparatus and a command relating to the start of operation by an operator of said device control apparatus is present for a predetermined time period.

9. A method for controlling a device, comprising the steps of:
   shutting off an operation source of the device;
   inhibiting the control of operation of the device;
   receiving a predetermined signal from at least one signal source;
   releasing the shut-off of the operation source performed in said shutting off step after the predetermined signal is received in said receiving step; and
   releasing the inhibition of the control performed in said control inhibiting step after the elapse of a first predetermined time period from the releasing of the shut-off of the operation source in said shut-off releasing step;
   suppressing the operation of the device; and
   releasing the suppression of the operation of the device after the elapse of a second predetermined period shorter than the first predetermined period from the releasing of the shut-off of the operation source in said shut-off releasing step.

10. A method according to claim 9 wherein the operation source is at least one of a power supplied to the device and a clock signal inputted to the device from an oscillation device connected to the device.

11. A method according to claim 9 wherein the predetermined signal is generated by the at least one signal source in response to at least one of the following events: a call from a line connected to the device, hooking detection, read document sheet detection, detection from a clock IC, and a command relating to the start of operation by an operator of the device.

12. A method according to claim 9 wherein the first predetermined period is long enough for the device to be stabilized after the release of the shut-off of the operation source in said shut-off releasing step.

13. A method according to claim 9 wherein the second predetermined period is long enough for the stable supply of the power to the device after the release of the shut-off of the operation source in said shut-off releasing step.

14. A method according to claim 9 wherein the second predetermined period is long enough for the stable supply of the clock signal to the device after the release of the shut-off of the operation source in said shut-off releasing step.

15. A method according to claim 9 wherein said suppressing step is provided separately from a step for suppressing the operation of said device in accordance with a voltage of a main power supply.

16. A method according to claim 9 wherein the shut-off of the operation source in said shutting off step and the inhibition of the control in said control inhibiting step are conducted when the device is ready to operate and none of a call from a line connected to the device and a command relating to the start of operation by an operator of the device is present for a predetermined time period.

* * * * *